United States Patent [19]

Kojima et al.

[11] Patent Number: 4,741,812

[45] Date of Patent: May 3, 1988

[54] METHOD FOR ETCHING ELECTRODE FOIL ALUMINUM ELECTROLYTIC CAPACITORS

[75] Inventors: Kouichi Kojima, Hirakata; Masanori Okabayashi, Uji; Nobuyoshi Kanzaki, Joyo; Kenji Touyama, Uji; Ryouichi Shimatani, Tsuzuki, all of Japan

[73] Assignee: Matsushita Electric Industrial Co., Ltd., Kadoma, Japan

[21] Appl. No.: 862,502

[22] PCT Filed: Aug. 30, 1985

[86] PCT No.: PCT/JP85/00481

§ 371 Date: Apr. 30, 1986

§ 102(e) Date: Apr. 30, 1986

[87] PCT Pub. No.: WO86/01544

PCT Pub. Date: Mar. 13, 1986

[30] Foreign Application Priority Data

Aug. 30, 1984 [JP] Japan .............................. 59-181312

[51] Int. Cl.⁴ .................................................. C25F 3/04
[52] U.S. Cl. ............................ 204/129.4; 204/129.75; 204/DIG.9; 204/129.43
[58] Field of Search .......... 204/129.4, 129.43, DIG.9, 204/129.75

[56] References Cited

U.S. PATENT DOCUMENTS

| | | | |
|---|---|---|---|
| 3,193,485 | 7/1965 | Vincent | 204/DIG. 9 |
| 4,087,341 | 5/1978 | Takahashi et al. | 204/129.43 |
| 4,140,599 | 2/1979 | Yamasaki et al. | 204/129.43 |
| 4,294,672 | 10/1981 | Ohba et al. | 204/129.4 |
| 4,297,184 | 10/1981 | Dyer | 204/129.43 |
| 4,319,972 | 3/1982 | Bemis | 204/129.43 |
| 4,482,434 | 11/1984 | Pliefke | 204/DIG. 9 X |
| 4,533,444 | 8/1985 | Oda et al. | 204/129.43 |
| 4,561,944 | 12/1985 | Sasaki et al. | 204/129.43 |
| 4,576,686 | 3/1986 | Hirokazu et al. | 204/129.75 X |

*Primary Examiner*—Donald R. Valentine
*Attorney, Agent, or Firm*—Cushman, Darby & Cushman

[57] ABSTRACT

An improved etching method for enhancing the operation rate of manufacturing equipment as well as manufacturing electrode foil with a high enlarging factor in a manufacturing method for electrode foil for aluminum electrolytic capacitors, which enables one to obtain an electrode foil with a high surface enlarging factor by performing electrolytic etching, using alternating current in an acidic hydrochloric acid solution, which does not produce white powder, under the conditions of the ratio of the negative to the positive cycle part of the electric charge impressed on the aluminum foil, being in a range between 0.2 and 2.0 and the duty ratio being 51–90%.

9 Claims, 2 Drawing Sheets

METHOD FOR ETCHING ELECTRODE FOIL ALUMINUM ELECTROLYTIC CAPACITORS

BACKGROUND OF THE INVENTION

The present invention relates to a method for etching electrode foil for aluminum electrolytic capacitors.

The so-called aluminum electrolytic capacitor is constituted by rolling an aluminum electrode foil and an insulating paper and impregnating the roll with an electrolyte for its driving. In this capacitor, the aluminum electrode foil has its surface undulated to increase its area by etching it, thereby increasing the elevating surface enlarging factor (surface area after etching/surface area before etching) of the aluminum foil is used. Heretofore, as the methods for etching the electrode foil for the aluminum electrolytic capacitors mainly for use at such a low voltage as less than 100 W.V., the following two methods normally have been normally employed.

Thus a first method is that using an etching solution of hydrochloric acid as its main component. The etching is performed, with placing an aluminum foil between two electrode plates facing each other and in parallelism thereto and with allowing an alternating current flowing to through the etching solution between the two electrode plates, without current directly flow through the aluminum foil.

A second method is that using an etching solution of sodium chloride as its main component. The etching is peformed, with immersing an aluminum foil in this etching solution, and by permitting a direct current or alternating current or alternating current-superposed direct current to flow in the etching solution between the aluminum foil and an electrode or electrodes placed on one or both sides of the aluminum foil.

However the first etching method was disadvantageous in that only a current that has symmetrical wave forms in its positive and negative cycle permits independent changes in its positive and negative wave width and in its positive and negative current densities, thus detracting from adequate enhancement of the surface enlarging factor, all the more so in view of the searching for on further miniaturization hereafter of aluminum electrolytic capacitors. The second etching method had a grave defect in that because of the use of a nearly neutral aqueous solution of sodium chloride as the etching solution, the aluminum ion which dissolves during electrolytic etching deposits on the production equipment or the like as hydroxide thereof (white powder); which interferes with smooth proceeding of production and upgrading of operation rate.

SUMMARY OF THE INVENTION

The present invention, is intended eliminate such prior art difficulties, and aims at enhancing the operation rate of the production equipment as well as producing aluminum foil having a high surface enlarging factor in an acidic hydrochloric acid solution, which does not form white powder.

Thus, according to the present invention, in conducting electrolytic etching with alternating current, using acidic hydrochloric solution which does not produce white powder as the etching solution, by a method of independently setting etching current wave forms of the positive and negative cycle by the etching current flow directly through the aluminum foil, a condition for the electrolytic etching by an alternating current is set that the ratio of the negative to the positive cycle electric charge to be impressed on the aluminum foil is in a range between 0.2 to 2.0, and duty ratio is at 51-90%.

In this way, an aluminum foil which shows higher surface enlarging factor can be obtained.

DETAILED DESCRIPTION OF A PREFERRED EMBODIMENT OF

In the etching method of the present invention, the ratio of the negative to the positive cycle part of the electric charge which is impressed on the aluminum foil and the duty ratio are set in appropriate ranges. The electric charge ratio and the duty ratio are determined in the following manner.

Figure 1A:
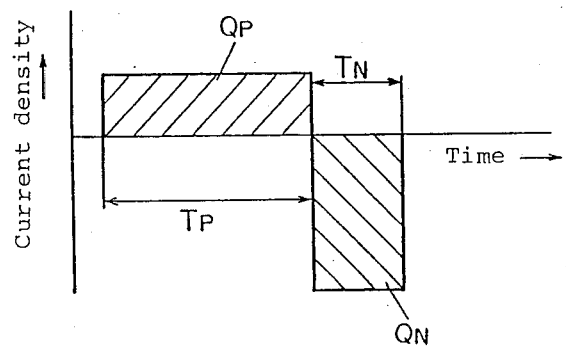
FIGS. 1 A and 1 B are wave form graphs showing wave forms of the current which is impressed on aluminum foil in the method for etching the electrode foil for aluminum electrolytic capacitors of the present invention.
Figure 1B:
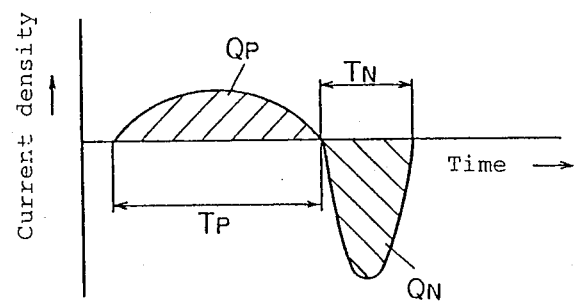

Thus FIGS. 1 A and 1 B show wave forms in respectively case that etching current wave forms are of rectangular wave and sine wave, form and provide the positive and the negative parts of the electric charge to be $Q_P$ and $Q_N$, and the positive and the negative wave form widths $T_P$ and $T_N$; the negative to the positive cycle electric charge ratio is represented by $Q_N/Q_P$; and the duty ratio is represented by $T_P/T_P+T_N$. In this invention, $Q_P/Q_P$ is set at 0.2-2.0, and $T_P/T_P+T_N$ at 51-90%.

In the following, an embodiment of the present invention is described. As a test sample, a 99.99% purity and 90 μm thick annealed aluminum foil was used.

Figure 2:
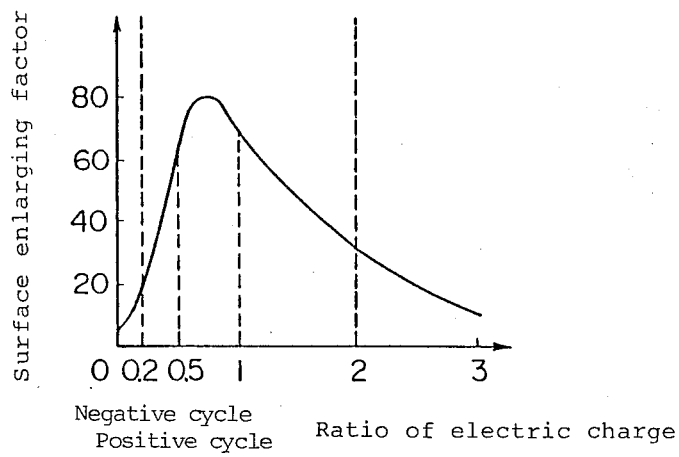
FIG. 2 is a characteristic graph showing the relationship between the ratio of negative to positive cycle part of the electric charge impressed on the aluminum foil and the surface enlarging factor according to the method of the present invention.
Figure 3:
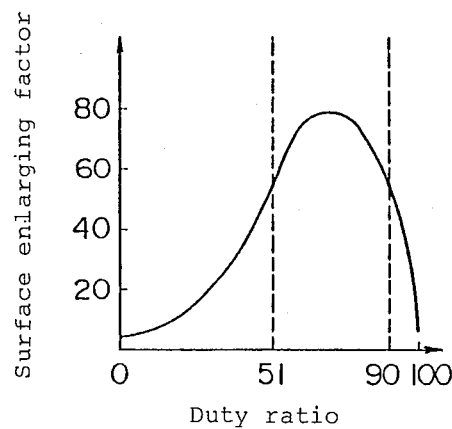
FIG. 3 is a characteristic graph showing the relationship between the duty ratio (=positive wave form width/(positive wave form width + negative wave form width)) and the surface enlarging factor according to the method of the present invention.

First, using as the counter-electrode a carbon plate in a 10% hydrochloric acid solution, an aluminum foil was etched at a temperature of 40° C. by lettering a rectangular wave current directly flow therethrough, and making to change positive and the negative pulse widths and the positive and the negative current densities in a manner that a positive current charge becomes 70 C/cm². As a result, it was found out that the surface enlarging factor depends on a ratio of the negative cycle electric change to the positive cycle electric charge as shown in FIG. 2, and the surface enlarging factor is high in the range of the ratio range of between 0.2 and 2.0. This electric charge ratio (negative cycle/positive cycle) is preferably in a range between 0.5 and 1.0. The reason is supposed to be as follows: The etching by alternating current in hydrochloric acid proceeds through repetition of the dissolution of aluminum at the time of the positive cycle part and the film formation due to the pH rise under hydrogen reduction at the time of negative cycle part, but if the electric charge of ratio the negative to the positive cycle is below than 0.2, the hydrogen reduction will not adequately proceed on the electrolyte's interface with the foil at the time of negative cycle, the film is barely formed, resulting in general corrosion. The enlarging factor is lower, if the aforementioned electric charge ratio is 2.0 or above, amount of the film formed at the time of negative cycle is too large, causing local corrosion; consequently, the etching proceeds only nonuniformly, resulting in a low surface enlarging factor.

Next, the etching was similarly performed at a 0.4 A/cm$^2$ of positive current density and with the duty ratio (positive pulse width/(positive pulse width + negative pulse width)) altered, while fixing the negative to the positive cycle electric charge ratio at 0.8. As a result, as shown in FIG. 2, the surface enlarging factor is high in a range wherein the duty ratio is of from 51% to 90%. The reason is supposed to be as follows: If the duty ratio is below 50%, undergoing chemical dissolution in the acidic hydrochloric acid, the etching pit formed is dissolved at its surface, resulting in low surface enlarging factor. On the other hand, if the duty ratio is higher than 90%, because negative pulse width is too small, pH rises locally in a short period of time, forming only nonuniform film; consequently, local corrosion will take place, resulting in a low surface enlarging factor.

As above-described, a high surface enlarging factor may be achieved with the negative to the positive cycle electric charge ratio in a range from 0.2 to 2.0, particularly, from 0.5 to 1.0, and with the duty ratio in a range from 51–90%, as the etching conditions in hydrochloric acid solution which does not produce white powder.

This effect may be also achieved similarly with a trapezoidal or sine wave, not only with a rectangular wave, where the etching current wave form is concerned.

The surface enlarging factors obtained under the aforementioned etching conditions and under the conventional conditions are compared at a positive current charge of 70 C/cm$^2$ in the following table.

| Example | Etching solution | White powder | Etching current wave form | Surface enlarging factor |
|---|---|---|---|---|
| Prior art example 1 | Hydrochloric acid | Not produced | Sine wave | 65 |
| Prior art example 2 | Sodium chloride | Produced | Rectangular wave | 80 |
| Embodiment | Hydrochloric acid | Not produced | Rectangular wave | 80 |

As this table indicates, in the hydrochloric acid solution it has been realized to heighten the surface enlarging factor more than before by about 20% as compared with the conventional method.

In the present invention, the hydrochloric acid solution is used as the etching solution, however, many experiments have suggested that as this hydrochloric acid solution, a 3–20% concentration hydrochloric acid solution containing aluminum chloride is preferable and the liquid temperature should preferably be 20°–80° C. The preferable frequency of the alternating current is 5–100 Hz.

As hereabove described, the method for etching the electrode foil for aluminum electrolytic capacitors of the present invention enables not only easy production of electrode foil with high surface enlarging factor in hydrochloric acid solution which does not produce white power but also attainment of improved operating rate of electrode foil manufacturing equipment, with resultant lowered manufacturing cost of capacitors.

We claim:

1. A method for etching foil for use in making aluminum electrolytic capacitors, comprising:
   impressing on aluminum foil, while in an electrolytic bath comprising an aqueous solution of hydrochloric acid as an etching solution, an alternating current having a ratio of electric charge of negative cycle to positive cycle in the range of 0.2 to 2.0 and a duty ratio in the range of 51–90 percent.

2. A method for etching electrode foil for aluminum electrolytic capacitors in accordance with claim (1) characterized in that said hydrochloric acid solution is a 3–20% concentration solution containing aluminum chloride and the temperature thereof is 20°–80° C.

3. A method for etching electrode foil for aluminum electrolytic capacitors in accordance with claim (1) characterized in that the frequency of said alternating current is 5–100 Hz.

4. A method for etching electrode foil for aluminum electrolytic capacitors in accordance with claim (1) characterized in that said ratio of electric charge of negative cycle to electric charge of positive cycle is in a range from 0.5 to 1.0.

5. A method for etching foil for use in making aluminum electrolytic capacitors according to claim 1, wherein:
   the hydrochloric acid solution has a hydrochloric acid concentration of 3–20 percent, the hydrochloric acid solution also contains aluminum chloride, the hydrochloric acid solution has a temperature of 20°–80° C., the alternating electric current has a frequency of 5–100 Hz, the ratio of electric charge of negative cycle to electric charge of positive cycle is in the range of 0.2 to 2.0, and the duty ratio is in the range of 51–90 percent.

6. A method for etching foil for use in making aluminum electrolytic capacitors according to claim 5, wherein:
   said alternating current has a rectangular wave form.

7. A method for etching foil for use in making aluminum electrolytic capacitors according to claim 5, wherein:
   said alternating current has a trapezoidal wave form.

8. A method for etching foil for use in making aluminum electrolytic capacitors according to claim 5, wherein:
   said alternating current has a sinusoidal wave form.

9. A method for etching foil for use in making aluminum electrolytic capacitors according to claim 8, wherein:
   the hydrochloric acid solution has a hydrochloric acid concentration of 3–20 percent, the hydrochloric acid solution also contains aluminum chloride, the hydrochloric acid solution has a temperature of 20°–80° C., the alternating electric current has a frequency of 5–100 Hz, the ratio of electric charge of nagative cycle to electric charge of positive cycle is in the range of 0.5 to 1.0, and the duty ratio is in the range of 51–90 percent.

* * * * *